July 24, 1928.
C. L. HOWARD
FLOOR CLIP
Filed Aug. 8, 1927
1,678,143
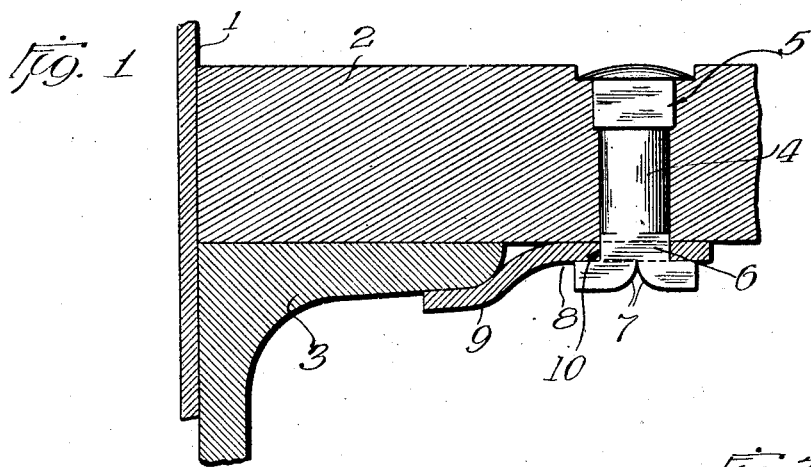
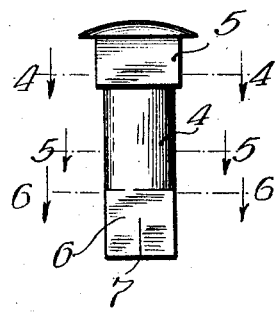
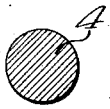
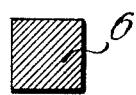
Witness:
Harry C. White
Inventor:
Charles L. Howard.

Patented July 24, 1928.

1,678,143

UNITED STATES PATENT OFFICE.

CHARLES L. HOWARD, OF CHICAGO, ILLINOIS, ASSIGNOR TO WESTERN RAILWAY EQUIPMENT CO., OF ST. LOUIS, MISSOURI.

FLOOR CLIP.

Application filed August 8, 1927. Serial No. 211,273.

This invention relates to an improved means for securing floor boards to car sills in order to prevent the floor boards from becoming loosened or displaced due to the twisting strains to which car framework is subjected.

In the drawings:

Fig. 1 is a vertical cross section showing the device in position;

Fig. 2 is a plan view of a clip constituting an element of the invention;

Fig. 3 is a side elevation of a bolt constituting another element of the invention and Figs. 4, 5 and 6 are cross sectional views of the bolt taken on the lines 4, 5 and 6 of Fig. 3.

In the drawings, 1 represents the sheathing of a car and 2 a floor board having an end supported by a flange of a side sill 3. Through a circular bore in the board 2 is inserted a bolt 4, the upper part 5 being of enlarged square cross section and the lower part 6 being of square cross section and slotted at 7.

A clip 8 has a portion 9, adapted when in position, to be clamped under the horizontal flange of the sill 3 as shown by Figure 1. In the clip is a non-circular opening 10, shown for example as a square opening to coact with the squared portion 6 of the bolt.

In applying the device, a round bolt-opening is first bored in the flooring and the bolt 6 is inserted and driven home. When driven in position the enlarged square portion 5 bites into the wood and prevents the bolt from rotating. The clip is then placed upon the bolt, the non-circular opening 10 fitting the non-circular portion 6 of the bolt and the end of the bolt is spread, this being permitted by means of the slot 7.

It will be seen that when the clip 8 is positioned as above described it will be prevented from rotating upon the bolt on account of the non-circular relationship between the lower portion of the bolt and the clip and, furthermore, the bolt itself will be prevented from turning in the flooring on account of the fit between the non-circular upper portion 5 of the bolt and the opening in the floor board.

From the above it will be clear that car flooring secured to the sills by this device will be capable of withstanding the strains and shocks to which it is subjected and that the flooring at all times will be held securely in position by the clip.

While I have shown the opening 10 of the clip and the portion 6 of the bolt square or non-circular shaped, I wish it understood that the opening in the clip and the lower portion 6 of the bolt may be of any other interfitting shape provided the shape in the clip and on the bolt prevents rotation of the clip upon the bolt. Moreover, I do not limit myself to any specific means for holding the clip in position, the slotted arrangement 7 simply being shown as an example. Nor do I restrict myself to the enlarged square portion 5 of the bolt as the means to prevent the bolt from turning in the flooring.

What I claim is:—

In a device of the class described, the combination with a floor sill, of a floor board supported thereby having a circular bore therethrough, a clip having a square shaped opening therein, a bolt adapted to be run through the bore in said floor and having an enlarged upper square portion adapted when driven in position to prevent rotation of the bolt in said bore and said bolt also having a lower square portion adapted to fit the opening in the clip to prevent rotation of the clip upon the bolt, and means comprising a slotted portion in the end of the bolt to retain the clip upon the bolt and in engagement with the sill and floor board.

CHARLES L. HOWARD.